(12) United States Patent
Kroeninger et al.

(10) Patent No.: US 7,664,587 B2
(45) Date of Patent: Feb. 16, 2010

(54) DEVICE FOR RECOGNIZING A VEHICLE OVERTURN

(75) Inventors: Mario Kroeninger, Buehl (DE); Michael Schmid, Kornwestheim (DE); Robert Lahmann, Nuremberg (DE)

(73) Assignee: Robert Bosch GmbH, Stuttgart (DE)

( * ) Notice: Subject to any disclaimer, the term of this patent is extended or adjusted under 35 U.S.C. 154(b) by 699 days.

(21) Appl. No.: 10/524,810

(22) PCT Filed: Mar. 18, 2003

(86) PCT No.: PCT/DE03/00873

§ 371 (c)(1),
(2), (4) Date: Aug. 10, 2005

(87) PCT Pub. No.: WO2004/020253

PCT Pub. Date: Mar. 11, 2004

(65) Prior Publication Data

US 2006/0015237 A1      Jan. 19, 2006

(30) Foreign Application Priority Data

Aug. 28, 2002   (DE)   ................. 102 39 406

(51) Int. Cl.
G06G 7/00       (2006.01)
G60G 23/00      (2006.01)
(52) U.S. Cl. .......................................... 701/70; 701/38
(58) Field of Classification Search ................... 701/70; 340/429
See application file for complete search history.

(56) References Cited

U.S. PATENT DOCUMENTS

| 6,301,536 | B1 | 10/2001 | Vaessen et al. |
| 6,438,463 | B1* | 8/2002 | Tobaru et al. .................. 701/1 |
| 6,604,035 | B1* | 8/2003 | Wetzel et al. .................. 701/38 |
| 6,654,671 | B2* | 11/2003 | Schubert ........................ 701/1 |
| 2002/0152012 | A1* | 10/2002 | Watson et al. .................. 701/45 |

FOREIGN PATENT DOCUMENTS

| DE | 199 10 596 | 9/2000 |
| DE | 101 49 112 | 4/2003 |
| EP | 1 101 658 | 5/2001 |

\* cited by examiner

*Primary Examiner*—Mark Hellner
*Assistant Examiner*—Helal A Algahaim
(74) *Attorney, Agent, or Firm*—Kenyon & Kenyon LLP

(57) ABSTRACT

An apparatus for detecting a vehicle rollover includes a sensor suite for sensing vehicle dynamics data, the sensor suite being connected to a processor which is configured in such a way that the processor detects a vehicle rollover as a function of the vehicle dynamics data and the rollover sensor suite. The processor has means for dividing an operating state of the vehicle into chronologically successive phases. In particular, the processor has means for determining, for each phase, a float angle and a transverse vehicle velocity from the vehicle dynamics data; the float angle and the transverse vehicle velocity being used, together with the data from the rollover sensor suite, for detection of the vehicle rollover.

11 Claims, 3 Drawing Sheets

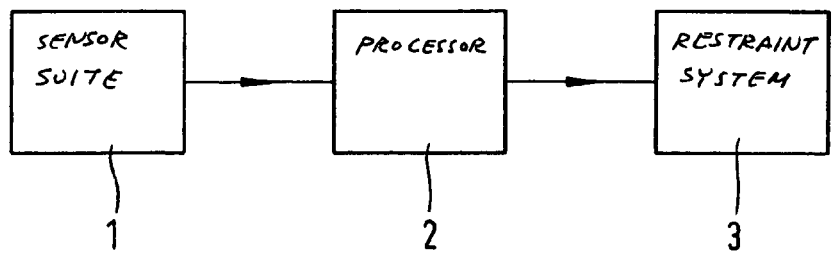
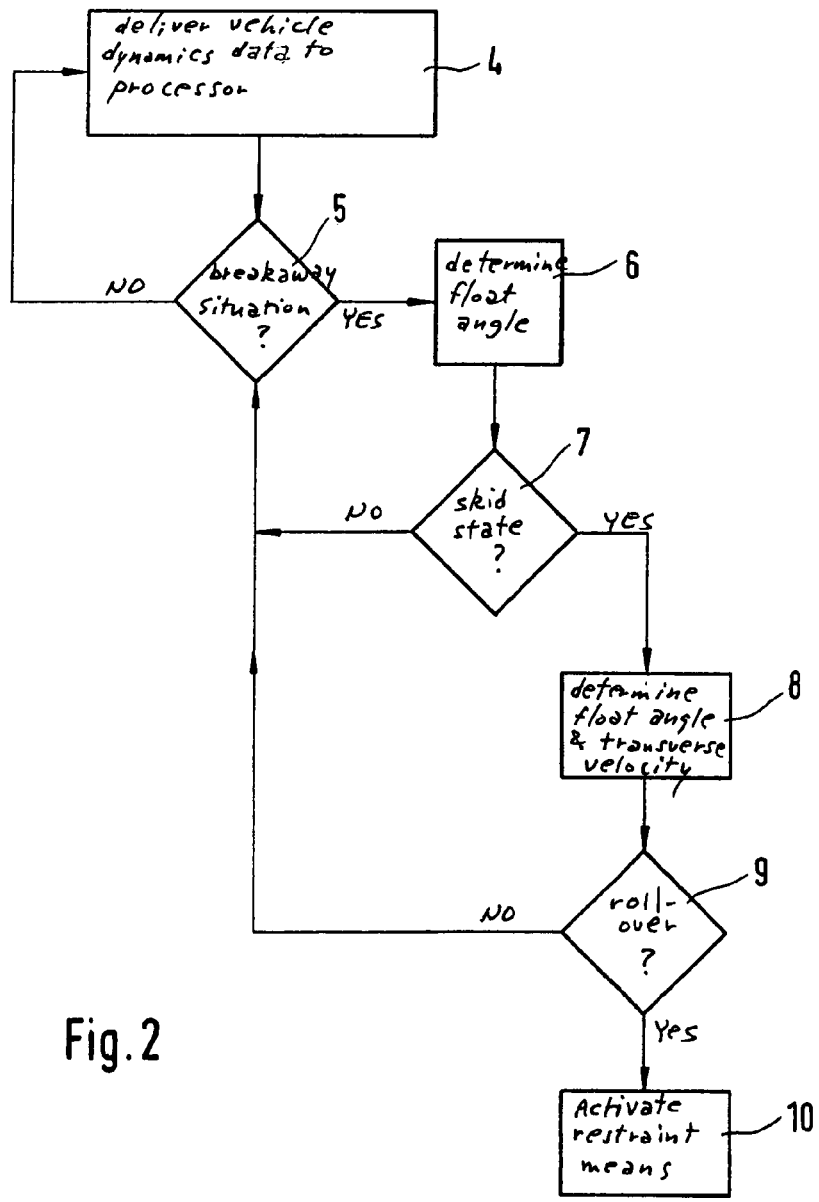

DEVICE FOR RECOGNIZING A VEHICLE OVERTURN

FIELD OF THE INVENTION

The invention proceeds from an apparatus for detecting a vehicle rollover.

BACKGROUND INFORMATION

German patent document DE 199 10 596 describes triggering restraint means as a function of vehicle dynamics data. Such data from, e.g., an ESP system can be used.

German Patent document DE 101 49 112 discloses a method for determining a triggering decision for restraint means in a vehicle, which method makes a triggering decision as a function of a float angle, a transverse vehicle velocity, and the vehicle tilt angle. The maximally achievable vehicle tilt angle is characterized by way of a transverse vehicle acceleration and/or a transverse vehicle velocity. An occupant detection system can additionally be used.

SUMMARY

The apparatus according to the present invention for detecting a vehicle rollover has the advantage that because the vehicle state is subdivided into chronologically successive phases, a corresponding determination of the float angle for the individual phases is possible. In other words, a separate calculation protocol for the float angle is used for each phase. This then makes possible, in particular, a determination of the float angle in the angle range greater than 10 degrees. The lateral velocity is also determined in this context. For vehicle rollovers with high lateral acceleration it is thus possible, in interaction with the rollover sensor suite (rotation rate about the longitudinal axis $\omega_x$, transverse vehicle acceleration $a_y$, and optionally vertical vehicle acceleration $a_z$), to arrive at a reliable triggering decision at very small roll angles, thus allowing considerably improved occupant protection as compared with conventional systems. The reason for this is that the lateral velocity, and therefore implicitly the float angle, decisively influences the rollover in the event of a soil trip. The float angle and the lateral velocity may be determined by multi-stage logic. A variety of calculation methods are combined for this purpose, and an implementation of the selection of the respective method is described. The method may be characterized by a sensing of the longitudinal velocity, the yaw rate (i.e. the rotation rate about the vertical axis of the vehicle), the lateral acceleration, and optionally the wheel rotation speeds, the longitudinal acceleration, and the steering angle, and an estimate of the float angle.

The operating state of a vehicle can be divided, for purposes of the present invention, into three categories that a vehicle passes through successively in the context of a skid. These are therefore chronologically successive phases. A change from an advanced phase back into a previous state can, however, also occur. These are, e.g., the stable operating state, a skidding motion (which can also be referred to as the breakaway state), and the skid or skid state itself.

It is advantageous that the stable operating state is characterized by a small and (for purposes of rollover detection) almost constant float angle, the skidding motion by a large change in float angle, and the skid by a float angle that exceeds a predefined threshold value. This allows the phases to be identified in order to select the corresponding calculation protocol for the float angle.

As discussed above, it is possible for the sensor suite not only to determine measured and estimated or calculated vehicle dynamics data such as longitudinal vehicle velocity, yaw rate, and a transverse vehicle acceleration, but also to evaluate further calculated or measured variables such as wheel rotation speeds, acceleration in the longitudinal vehicle direction, steering angle, and a float angle that has been ascertained, for example, by way of a control unit for the vehicle dynamics control system. In present-day systems for vehicle dynamics control, however, the latter value has validity only for small float angles, since the vehicle state can be successfully influenced only for float angles of a few degrees, and only that range must therefore be acted upon. A device for measuring the float angle and/or the transverse vehicle velocity can also be used.

Lastly, it is also advantageous that the apparatus according to the present invention is connectable to a restraint system that activates the processor of the apparatus as a function of detection of a rollover. The result, in particular, is that according to the present invention the triggering of such restraint means, by utilization of the float angle β and lateral vehicle acceleration velocity $V_y$ in addition to the rollover sensor suite ($\omega_x$, $a_y$, and $a_z$), becomes more accurate and more situationally appropriate.

BRIEF DESCRIPTION OF THE DRAWINGS

FIG. 1 is a block diagram of the apparatus according to the present invention.

FIG. 2 is a flow chart of the sequence executed by the apparatus according to the present invention.

DETAILED DESCRIPTION

Figure 3:
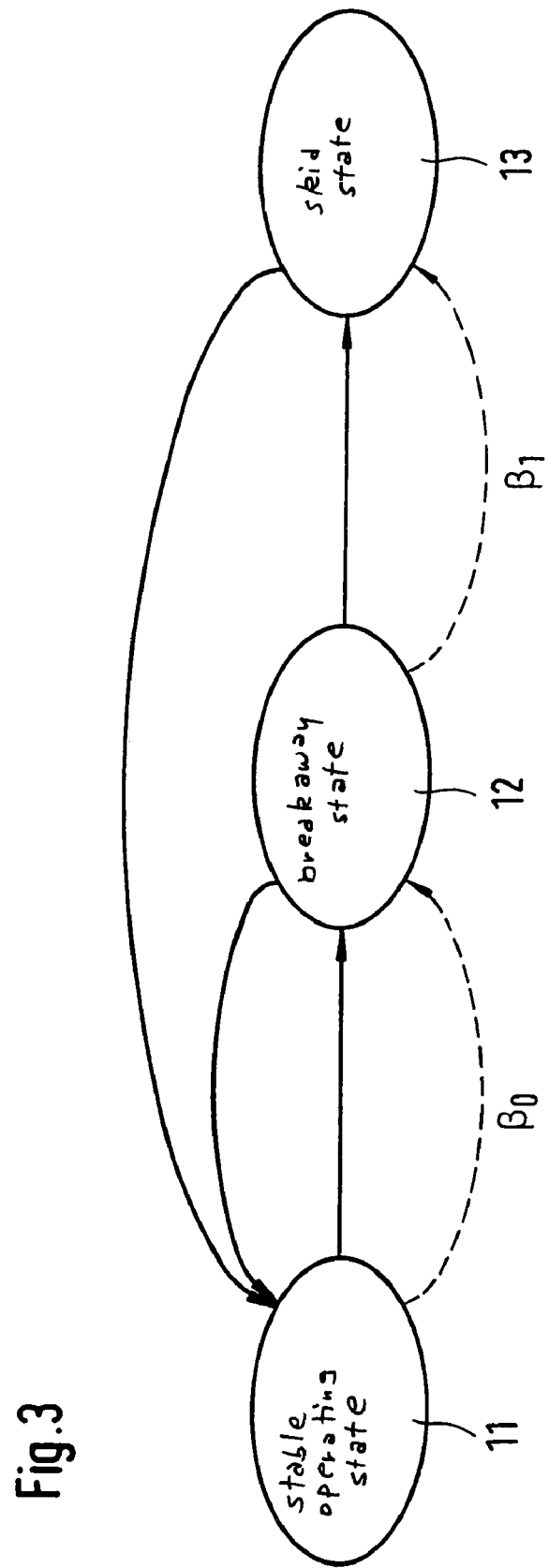
FIG. 3 is a state diagram for the sequence of the apparatus according to the present invention.

Modern vehicles are equipped with restraint means, for example a window airbag or belt tensioner, that allows the occupants to be protected in the event of a vehicle rollover. Existing systems for rollover detection consider the roll motion and the accelerations in the X, Y, and Z directions of the vehicle. Reliable detection of a vehicle rollover is possible on this basis. The decision cannot be made, however, until a late point in time during the rollover, typically at a roll angle of 20 to 40 degrees. In certain instances of vehicle rollovers, however, (so-called "soil trips"), this is too late for sufficient protection of the occupant, since as a result of the high lateral acceleration he has already experienced a sideways displacement that greatly limits the usefulness of, for example, window airbags. As indicated in the existing art, a method is already known that makes possible a timely triggering decision in a context of high lateral acceleration by also incorporating the float angle and the lateral acceleration of the vehicle.

The present invention provides, for determining the float angle in the angular range greater than 20 degrees and the lateral velocity that are to be used for rollover detection, an apparatus that subdivides the operating state of a vehicle into chronologically successive phases, a determination of the float angle and of the transverse vehicle velocity from the vehicle dynamics data being performed for each phase, and the type of determination of the float angle and of the transverse vehicle velocity being different in the individual phases.

The determination method, e.g., a calculation method, is precisely allocated to the respective phase and takes into account the physical circumstances of that phase. Three phases, for example, are distinguished: the stable vehicle state; a skidding motion that is also referred to as the breakaway state; and the skid itself, i.e., the skid state.

The float angle and the lateral velocity $V_y$ are to be determined hereinafter by multi-stage logic. A variety of calculation methods are combined for that purpose, and an implementation of the selection of the respective method is described.

FIG. 1 is a block diagram of the apparatus according to the present invention. A sensor suite 1 is connected via a data output to a processor 2. Processor 2, which also has memory means, is connected via a data output to a restraint system 3. Sensor suite 1 supplies vehicle dynamics data and rollover data (yaw rate and horizontal accelerations). Sensor suite 1 has acceleration and rotation-rate sensors for that purpose. Sensing of the wheel rotation speed and the steering angle can also be provided in sensor suite 1. Sensor suite 1 can be distributed in the vehicle and/or concentrated in a central control device. Here sensor suite 1 supplies a digital signal to processor 2. Digital sensors that already output a digitized sensor signal are generally used.

It is possible to use analog sensors whose signal is digitized either in processor 2 or by way of a separate analog/digital converter. Digitization is necessary for further processing. Sensor suite 1 can also encompass a control unit for vehicle dynamics control that can indicate an estimated value for a float angle at small angles. Such vehicle dynamics control systems are generally suitable only for angle ranges below 10 degrees, for example, methods that use a model made up of tire characteristics and lateral guidance force. Vehicle dynamics control may no longer be performed successfully, in particular, at greater float angles. Sensor suite 1 can likewise have a control unit that supplies calculated or prepared variables, for example, the longitudinal vehicle velocity.

Sensor suite 1 can therefore, as indicated above, be disposed outside a housing in which processor 2 is located. The electrical connection between sensor suite 1 and processor 2 can be implemented by way of a bus or a two-wire conductor or a plurality of two-wire conductors. In the case of two-wire conductors, it is possible for the information flow to be established unidirectionally from sensor suite 1 to processor 2.

In addition to the conventional rollover sensor suite ($\omega_x$, $a_y$, and $a_z$), processor 2 evaluates the vehicle dynamics data of sensor suite 1 and can detect a vehicle rollover therefrom by ascertaining the float angle and the transverse vehicle velocity. The float angle and the transverse vehicle acceleration are now determined here as a function of the identified phase of the operating state. A separate calculation protocol is provided for each phase. Here, three phases may be provided: the stable operating state, a breakaway state, and the skid state. A subdivision into more or fewer than three phases is also possible.

The vehicle is initially in the stable operating state, which includes cornering at a low float angle. When this state exists, the float angle and the lateral velocity are of no interest for rollover detection because they are too low to initiate a rollover motion. The value resulting as an estimated lateral velocity $v_{y0}$ is therefore zero. In this phase, the estimated float angle $\beta_0$ can be regarded as a constant for rollover detection, the constant being vehicle-dependent and being determined by way of the maximum achievable float angle during cornering. As an alternative, it is also possible to use the float angle $\beta_{ESP}$, as calculated, e.g., in a control unit using tire characteristic models, as a transfer value for the next state. A further alternative is to determine the float angle $\beta_0$ that is to be used at the transition to phase 2 by estimating the vehicle situation, for example on the basis of a steering angle (suitably filtered, if applicable), the yaw rate, and the transverse vehicle acceleration.

The second phase is characterized by an incipient skidding motion. This can be detected, for example, by way of a large change in float angle or a sharp drop in a lateral acceleration previously of longer duration. The basis for this is that a skid begins, inter alia, when the lateral guidance forces during cornering are no longer sufficient to keep the vehicle stable, and the wheels therefore slip laterally.

The change in float angle is calculated using the following equation:

$$\dot{\beta} = \omega_z \frac{a_y \cos^2(\beta) + a_x \cos(\beta)\sin(\beta)}{v_x}$$

$$\approx \omega_z - \frac{a_y}{v_x} \text{ for small values of } \beta$$

In this phase the float angle $\beta_1$ can be determined by additively integrating the change in float angle, taking as the initial value the previously ascertained value $\beta_0$ from phase 1. This is then determined with the following equation:

$$\beta_1 = \beta_0 + \int \dot{\beta} dt$$

The lateral velocity $V_y$ is then obtained from the float angle $\beta_1$ and the vehicle's longitudinal velocity $v_x$:

$$v_{y,1} = v_x \tan(\beta_1).$$

The third phase is characterized by skidding of the vehicle. This is detectable, for example, by way of a float angle $\beta_1$ beyond a specific threshold $\beta_{min}$ and/or by locking of the wheels at a yaw rate $\omega_z$ greater than a minimum yaw rate $\omega_{zmin}$.

The float angle $\beta_2$ is then calculated by additive integration of the yaw rate, the previously ascertained value $\beta_1$ from the second phase being taken as the initial value;

$$\beta_2 = \beta_1 + \int \omega_2 dt.$$

The lateral velocity is then obtained from the float angle and the center-of-mass velocity $V_{sp}$ of the vehicle:

$$v_{y,2} = v_{sp} \sin(\beta_2).$$

The center-of-mass velocity is obtained from the initial longitudinal velocity, the initial lateral velocity, and the lateral acceleration $a_y$, and optionally the longitudinal acceleration $a_x$.

FIG. 2 is a flow chart illustrating the sequence occurring in the apparatus according to the present invention shown in FIG. 1. In method step 4, sensor suite 1 delivers the vehicle dynamics data to processor 2. Method step 5 then checks whether the stable state is being departed from, i.e. whether a breakaway situation exists. Processor 2 checks this on the basis of the vehicle dynamics data. If that is not the case, execution branches back to method step 4. If it is the case, however, the breakaway state is then detected in method step 6 and the float angle is determined as described above. This also applies to the transverse vehicle velocity. Method step 7 then checks whether phase 3, i.e., the skid state, has been reached. If that is not the case, execution branches back to method step 5. If it is the case, however, execution then branches to method step 8 and we are in the detected skid state, the float angle and transverse vehicle velocity now being determined as indicated above. Method step 9 then checks whether a vehicle rollover has been detected on the basis of the vehicle dynamics data and the rollover sensor suite ($\omega_x$, $a_y$, and $a_z$). If that is not the case, execution branches back to method step 5. If it is the case, however, execution then branches to method step 10, and restraint means 3 are activated by processor 2. In the context of a vehicle rollover, these are, for example, airbags that protect the head region in particular, a roll bar, and belt tensioners that prevent the person from sliding out (i.e., the "submarining" effect) during a rollover.

FIG. 3 shows a diagram of the states through which the apparatus according to the present invention passes. From a stable operating state 11, the apparatus moves into breakaway state 12 when, as presented above, a breakaway detection exists. The transfer parameter that is transferred is the float angle $\beta_0$. In breakaway state 12, a check is made as to whether a stable state is detected or a skid state exists. If a stable operating state was detected, the system then moves from breakaway state 12 back into stable operating state 11. If a skid state is detected, however, the system then moves to state 13 (the skid state), and the float angle $\beta_1$ is transferred as a parameter.

If neither of the two is present, the system remains in breakaway state 12. In the skid state, a check is then made as to whether the stable operating state again exists. In that case the system moves from state 13 back into stable operating state 11. A check is also made as to whether the restraint means are to be triggered.

Figure 4:
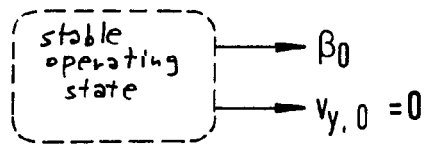
FIG. 4 is a block diagram indicating the parameters characteristic of the stable operating state.
Figure 5:
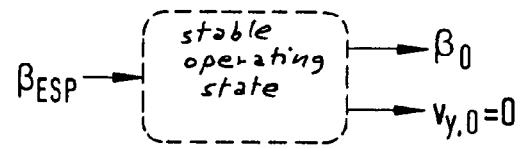
FIG. 5 is a second block diagram characterizing the stable operating state.

FIG. 4 shows that the estimated float angle value $\beta_0$ and a transverse vehicle velocity of zero are present as output parameters of the stable operating state. FIG. 5 depicts a variant in which the float angle $\beta_{ESP}$ is supplied by the vehicle dynamics control system. In that case as well, the float angle $\beta_0$ and a transverse vehicle velocity $V_y$ equal to zero are present as output values.

Figure 6:
FIG. 6 is a first block diagram characterizing the breakaway state.
Figure 7:
FIG. 7 is a second block diagram characterizing the breakaway state.

FIG. 6 shows the parameters involved in determining the float angle $\beta_1$ and transverse vehicle velocity $v_{y1}$ in the breakaway state. This requires the float angle $\beta_0$ from the stable operating state, the longitudinal vehicle velocity $v_x$, the yaw rate $\omega_z$, the transverse vehicle acceleration $a_y$, and the longitudinal vehicle acceleration $a_x$. As shown in FIG. 7, it is also possible to omit the longitudinal vehicle acceleration and to determine the float angle $\beta_1$ and transverse vehicle velocity $v_{y1}$ using only the float angle $\beta_0$, longitudinal vehicle velocity $v_x$, yaw rate $\omega_z$, and transverse vehicle acceleration $a_y$.

Figure 8:
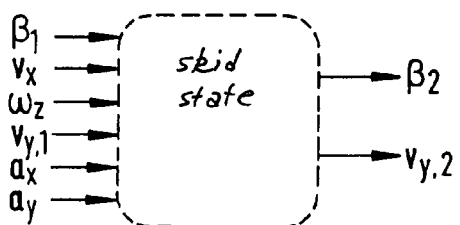
FIG. 8 is a first block diagram characterizing the skid state.
Figure 9:
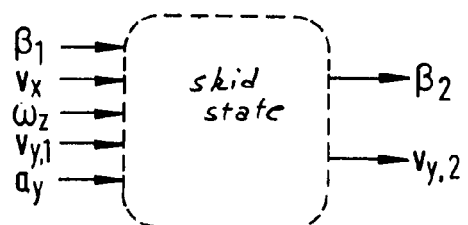
FIG. 9 is a second block diagram characterizing the skid state.

FIG. 8 shows the parameters necessary for determination of the float angle $\beta_2$ and transverse vehicle velocity $v_{y2}$ in the skid state. Here these are the float angle $\beta_1$, longitudinal vehicle velocity $v_x$, yaw rate $\omega_z$, transverse vehicle velocity $v_{y1}$, longitudinal vehicle acceleration $a_x$, and transverse vehicle acceleration $a_y$. As depicted in FIG. 9, it is alternatively possible to omit the longitudinal vehicle acceleration.

What is claimed is:

1. An apparatus for detecting a vehicle rollover, comprising:
   a sensor arrangement for sensing vehicle dynamics data and rollover data; and
   a processor connected to the sensor arrangement, wherein the processor categorizes an operating state of the vehicle into one of a plurality of successive phases, and wherein the processor determines, for each phase, a float angle and a transverse vehicle velocity from the vehicle dynamics data and the rollover data, and wherein the vehicle rollover is detected based on the float angle and the transverse vehicle velocity wherein chronologically successive phases include a stable operating state, a breakaway state, and a skid state, wherein the stable operating state is characterized by a constant value of the float angle, the breakaway state is characterized by an increase in the float angle by at least 20 degrees, and the skid state is characterized as occurring after the breakaway state has occurred and where the vehicle is skidding and of the float.

2. The apparatus as recited in claim 1, wherein the vehicle dynamics data includes at least one of a longitudinal vehicle velocity, a yaw rate and a transverse vehicle acceleration.

3. The apparatus as recited in claim 1, wherein the vehicle dynamics data includes at least one of a longitudinal vehicle velocity, a yaw rate and a transverse vehicle acceleration.

4. The apparatus as recited in claim 2, wherein the sensor arrangement additionally detects and outputs at least one of a wheel rotational speed, a longitudinal vehicle acceleration, a steering angle, and an estimate of the float angle.

5. The apparatus as recited in claim 3, wherein the sensor arrangement additionally detects and outputs at least one of a wheel rotational speed, a longitudinal vehicle acceleration, a steering angle, and an estimate of the float angle.

6. The apparatus as recited in claim 1, wherein the apparatus is connected to a restraint system that is activated by the processor based on the detection of the rollover.

7. The apparatus as recited in claim 1, wherein the apparatus is connected to a restraint system that is activated by the processor based on the detection of the rollover.

8. The apparatus as recited in claim 2, wherein the apparatus is connected to a restraint system that is activated by the processor based on the detection of the rollover.

9. The apparatus as recited in claim 3, wherein the apparatus is connected to a restraint system that is activated by the processor based on the detection of the rollover.

10. The apparatus as recited in claim 4, wherein the apparatus is connected to a restraint system that is activated by the processor based on the detection of the rollover.

11. The apparatus as recited in claim 5, wherein the apparatus is connected to a restraint system that is activated by the processor based on the detection of the rollover.

* * * * *

UNITED STATES PATENT AND TRADEMARK OFFICE
CERTIFICATE OF CORRECTION

PATENT NO. : 7,664,587 B2  Page 1 of 1
APPLICATION NO. : 10/524810
DATED : February 16, 2010
INVENTOR(S) : Kroeninger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1200 days.

Signed and Sealed this

Thirtieth Day of November, 2010

David J. Kappos
*Director of the United States Patent and Trademark Office*